US012261753B2

(12) United States Patent
Muñoz De La Torre Alonso et al.

(10) Patent No.: US 12,261,753 B2
(45) Date of Patent: Mar. 25, 2025

(54) METHOD OF SUPPORTING PACKET FLOW DESCRIPTOR MANAGEMENT IN A SERVICE BASED ARCHITECTURE BASED TELECOMMUNICATION NETWORK

(71) Applicant: Telefonaktiebolaget LM Ericsson (publ), Stockholm (SE)

(72) Inventors: Miguel Angel Muñoz De La Torre Alonso, Madrid (ES); Miguel Angel Puente Pestaña, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 26 days.

(21) Appl. No.: 18/013,827

(22) PCT Filed: Aug. 2, 2021

(86) PCT No.: PCT/EP2021/071563
§ 371 (c)(1),
(2) Date: Dec. 29, 2022

(87) PCT Pub. No.: WO2022/048841
PCT Pub. Date: Mar. 10, 2022

(65) Prior Publication Data
US 2023/0300041 A1    Sep. 21, 2023

(30) Foreign Application Priority Data
Sep. 1, 2020    (EP) ..................... 20382777

(51) Int. Cl.
*H04L 43/026* (2022.01)
(52) U.S. Cl.
CPC .................. *H04L 43/026* (2013.01)
(58) Field of Classification Search
CPC ......... H04L 45/00; H04L 45/42; H04L 45/54; H04L 45/64; H04L 45/655;
(Continued)

(56) References Cited

U.S. PATENT DOCUMENTS 11,005,765 B2 *   5/2021   Bacik ................. H04L 43/026
2017/0332282 A1 * 11/2017  Dao ................... H04L 1/0002
(Continued)

FOREIGN PATENT DOCUMENTS

WO    2019201457 A1    10/2019

OTHER PUBLICATIONS

LTE: Nu reference Point between SCEF and PFDF for sponsored data connectivity (3GPP TS 29.250 version 14.1.0 Release 14; ETSI TS 129250 V14.1.0 , pp. 1-23; Oct. 2017 (Year: 2017).*
(Continued)

*Primary Examiner* — James N Fiorillo
(74) *Attorney, Agent, or Firm* — Weisberg I.P. Law, P.A.

(57) ABSTRACT

A method of supporting Packet Flow Descriptor, PFD, management in a Service Based Architecture, SBA, based telecommunication network, wherein said telecommunication network comprises an Application Function, AF, that is arranged for implementing an Packet Flow Descriptor, PFD, management service allowing request and response message from and to a Network Exposure Function, NEF, comprised by said telecommunication network, said method comprises the steps of receiving, by said AF, from said NEF, a request message for requesting a PFD, wherein said request message comprises an application identification for identifying an application transmitting, by said AF, to said NEF, a response message comprising said application identification and said requested PFD. A complementary method and corresponding network functions and a computer program product are also presented herein.

16 Claims, 6 Drawing Sheets

(58) Field of Classification Search
CPC . H04L 45/7453; H04L 47/20; H04L 47/2441;
H04L 47/2483; H04L 41/0893; H04L
41/0896; H04L 67/14; H04L 67/327;
H04L 12/1407; H04W 48/18; H04W
76/12; H04W 24/08
USPC .......................................................... 709/238
See application file for complete search history.

(56) References Cited

U.S. PATENT DOCUMENTS

| | | | |
|---|---|---|---|
| 2018/0069798 A1* | 3/2018 | Bacik | H04L 43/026 |
| 2019/0174449 A1* | 6/2019 | Shan | H04W 60/04 |
| 2020/0007414 A1* | 1/2020 | Smith | H04L 67/12 |
| 2020/0008044 A1* | 1/2020 | Poornachandran | H04L 41/5019 |
| 2020/0145876 A1* | 5/2020 | Dao | H04L 12/1407 |
| 2020/0195495 A1* | 6/2020 | Parker | H04L 41/40 |
| 2021/0289390 A1* | 9/2021 | Zhou | H04W 28/0933 |
| 2021/0314266 A1* | 10/2021 | Li | H04L 47/2441 |
| 2022/0014963 A1* | 1/2022 | Yeh | G06N 7/01 |
| 2022/0030407 A1* | 1/2022 | Bercovici | H04W 24/02 |
| 2022/0038554 A1* | 2/2022 | Merwaday | H04L 45/64 |
| 2022/0086693 A1* | 3/2022 | Zhou | H04W 4/24 |
| 2022/0182923 A1* | 6/2022 | Yao | H04W 4/14 |
| 2022/0272706 A1* | 8/2022 | Sengupta | H04W 52/18 |
| 2023/0034349 A1* | 2/2023 | Mladin | H04W 4/40 |
| 2023/0188424 A1* | 6/2023 | Xin | G06N 20/00 709/223 |

OTHER PUBLICATIONS

Nokia, et al., "TS 23.503: PDF management descriptions", SA WG2 Meeting #123, Oct. 23-27, 2017, Ljubljana, Slovenia, S2-178167, pp. 1-4.

ETSI, "5G; Procedures for the 5G System (5GS) (3GPP TS 23.502 version 16.5.0 Release 16)", Technical Specification, ETSI TS 123 502 V16.5.0 (Jul. 2020), pp. 1-596.

3rd Generation Partnership Project; 3rd Generation Partnership Project; Technical Specification Group Core Network and Terminals; 5G System; Network Exposure Function Northbound APIs; Stage 3 (Release 16); 3GPP TS 29.522 V16.4.0 (Jun. 2020); Technical Specification; pp. 1-159.

* cited by examiner

METHOD OF SUPPORTING PACKET FLOW DESCRIPTOR MANAGEMENT IN A SERVICE BASED ARCHITECTURE BASED TELECOMMUNICATION NETWORK

TECHNICAL FIELD

The present disclosure generally relates to the field of telecommunications and more specifically to methods and service functions for supporting packet flow descriptor management service in a telecommunications network.

BACKGROUND

The Fifth Generation, 5G, telecommunications system is under standardization by the Third Generation Partnership Project, 3GPP. A disruptive change is already agreed wherein traditional peer to peer interfaces and protocols are modified by a so called Service Based Architecture, SBA, comprising a plurality of Network Function, NFs, where each NF provides one or multiple services as a producer to one or multiple consumers, by means of a protocol that is being specified in 3GPP stage 3.

For each NF, services have been defined. For example, for the User Data Management, UDM, NF the following services are defined:
  User Equipment, UE, Context Management, wherein the basic functionality is to allow a consumer NF to be registered as the serving NF for a particular UE.
  Subscriber Data Management, whose basic functionality is to allow a consumer NF to access to subscription data for a particular UE.
  UE Authentication, wherein the basic functionality is to allow a consumer NF to get UE authentication data.

3GPP defines the so called Packet Flow Descriptor, PFD, management procedure between Network Exposure Function, NEF, and Application Function, AF, so that AF can provide PFDs to NEF, which are later fetched by Session Management Function, SMF, and installed in User Plane Function, UPF, to allow traffic classification.

As specified so far in 3GPP, this procedure is initiated by AF. This is due to the fact that in the use cases that drive this procedure the AF is the party interested in providing the PFDs to the operator. For example, the application requests a special Quality of Service, QoS, treatment, or the application offers sponsored data to their users wherein the application pays for the users' traffic etc.

For the applications that do not provide PFDs, the operator shall rely on Deep Packet Inspection, DPI, techniques to classify the traffic. These techniques include shallow packet inspection on layers L3, L4 and deep packet inspection on layers L4 and higher.

When the traffic is not encrypted, usually shallow or deep packet inspection work well to identify the traffic based on the destination Uniform Resource Locators, URLs, Server Name Indications, SNIs, and other fields in clear that can be read by a DPI engine.

However, due to the recent increase of the adoption of traffic encryption, operators are struggling more and more to classify traffic since their DPI solutions are not capable of classifying encrypted traffic.

In order to address this problem, some third party traffic classification services offer accurate solutions based on the collaboration with many applications and Over The Top platforms, OTTs. They also implement sophisticated machine learning solutions to classify applications based on patterns, etc. Current research efforts are being directed towards offering these sort of classification services to the operators.

Therefore, for an operator to use this sort of third party classification services, it should be able to use the third party Application Programming Interfaces, APIs, via its exposure framework. However, there is no current solution in 3GPP allowing this kind of interactions.

SUMMARY

In a first aspect of the present disclosure, there is presented a method of supporting Packet Flow Descriptor, PFD, management in a Service Based Architecture, SBA, based telecommunication network, wherein said telecommunication network comprises an Application Function, AF, that is arranged for implementing an Packet Flow Descriptor, PFD, management service allowing request and response message from and to a Network Exposure Function, NEF, comprised by said telecommunication network, said method comprises the steps of receiving, by said AF, from said NEF, a request message for requesting a PFD, wherein said request message comprises an application identification for identifying an application, transmitting, by said AF, to said NEF, a response message comprising said application identification and said requested PFD.

The inventors have found that it may be beneficial to extend the Nnef northbound API as specified in the 3GPP TS 29.522. The present disclosure allows the NED to act as a client towards the AF. In other words, the NEF may be the party initiating the interaction with AF.

The present disclosure therefore discloses to implement a Packet Flow Descriptor, PFD, management service at the AF such that the NEF is able to invoke that particular service by, for example, requesting PFDs for a particular application.

It is noted that the AF may determine the application identification and the requested PFD based on the received information in the request message, like the identification for identifying the application but also the identification of the operator and the identification of the location, which will be explained in more detail later below.

The present disclosure is thus directed to a solution in which an operator is allowed to request or subscribe to an external classification service.

It is noted that, in accordance with the present disclosure, the AF may "on-board" to the NEF indicating the support of the new service, i.e. the PFD management service for example Naf_PFDManagement, for traffic classification. In the corresponding on-board request message, the AF may include any of:
  The list of application identifications, i.e. App-IDs, for which the AF can provide traffic classification information, and
  The type of classification information provided per App-ID such as deterministic traffic filters, non-deterministic heuristic rules, machine learning models, and
  Whether the AF accepts requests for App-IDs not included in the set of supported App-IDs above. For example, the AF may be able to run machine learning processes, or other techniques, to try to detect and classify a certain application on the fly.

As an example, the NEF invokes the PFD management service in the AF by sending a subscription request message including any of:
  list of App-ID to retrieve the corresponding PFDs, and
  operator-ID, i.e. the ID of the operator so that AF can identify it and apply the proper permissions.

location-ID, i.e. an indication of the location of operation of the operator. This may influence the App-IDs the operator is able to retrieve given the operation zone, for example e.g. a given country.

Once the AF receives such a message from the NEF, the AF may respond including a list of tuples, each tuple may include any of:
- the application identification, i.e. the App-ID, and
- The PFDs, which may include any of:
  - deterministic traffic filters;
  - non-deterministic heuristic rules;
  - machine learning models.

It is noted that the AF may determine whether it respond with any of the PFD based on the operator-ID and based on the location-ID. That is, the AF may check an internal database, for example, to determine whether the operator-ID and/or the location-ID are approved. If that's the case, the AF may continue and respond as disclosed above.

In an example, the AF may have a list of supported locations available, and may check whether the received location-ID in the request message matched any of the supported locations available. If not, it may not continue with providing the PFD as proposed. If a match is present, then the process may continue as proposed in the present disclosure.

An advantage of the method according to the present disclosure is that it allows an operator to initiate the interaction towards an external traffic classification service, which was previously not possible. This can be made possible either using a request/response or subscribe/notify operation. Such a method also allows to maximize the accuracy of the Fifth Generation Core Network, 5GC, Analytics by extending the Nnef interface.

In an example, the method further comprises the initial steps of:
- transmitting, by said AF, to said NEF, an on-board request message comprising an indication of supporting said PFD management service and comprising a list of application identifications that are supported by said PFD management service for obtaining PFDs The advantage of this example is that the NEF is made aware of the existence of the PFD management service such that the NEF can use that particular service for obtaining PFDs. The on-board request message may comprise the list of application identifications that are supported by the service for providing the PFDs.

It is noted that the messages that comprise the list of application identifications may further be implemented in such a way that the list of application identifications are listed along with supported classification types, being at least one of deterministic traffic filters, non-deterministic heuristic rules and machine learning models.

In a further example, the method further comprises the steps of:
- receiving, by said AF, from said NEF, a subscription request message comprising a list of application identifications, wherein said subscription request message is for requesting to be notified when a new PFD is available for an application identification in said list of application identifications,
- transmitting, by said AF, to said NEF, when a new PFD is available for an application identification in said list of application identifications, a notify message, wherein said notify message comprises said PFD and said application identification.

The advantage of this particular example is that the NEF no longer, actively, needs to request for updated PFDs. The NEF may assume that the PFDs that it has available are the most recent ones for the applications. The AF will transmit new, or updated, PFDs to the NEF whenever they become available.

In a second aspect, there is provided a method of supporting Packet Flow Descriptor, PFD, management in a Service Based Architecture, SBA, based telecommunication network, wherein said telecommunication network comprises an Application Function, AF, that is arranged for implementing an Packet Flow Descriptor, PFD, management service allowing request and response message from and to a Network Exposure Function, NEF, comprised by said telecommunication network, said method comprising the steps of:
- sending, from said NEF, to said AF, a PFD request message, wherein said PFD request message comprises an application identification for which a PFD is requested;
- receiving, by said NEF, from said AF, said requested PFD for said identified application.

The PFD request message is a new message defined within the scope of the 3GPP 5G telecommunication standard. The newly defined message may comprise a list of application identifications for which PFDs are to be retrieved, an operator identification so that the AF may identify the operator and apply appropriate permissions.

It is noted that the advantages as disclosed with respect to the first aspect of the present disclosure, being the method performed by the Application Function, are also applicable to the second aspect of the present disclosure, being the method performed by the Network Exposure Function, NEF.

In an example, the method further comprises the step of receiving, by said NEF, from said AF, an on-board request message comprising an indication of supporting said PFD management service and comprising a list of application identifications that are supported by said PFD management service for obtaining PFDs.

Here, the on-board request message may comprise said list of application identifications along with supported classification type, being at least one of deterministic traffic filters, non-deterministic heuristic rules and machine learning models.

In a further example, the method further comprises the steps of:
- transmitting, by said NEF, to said AF, a subscription request message comprising a list of application identifications, wherein said subscription request message is for requesting to be notified when a new PFD is available for an application identification in said list of application identifications,
- receiving, by said NEF, from said AF, when a new PFD is available for an application identification in said list of application identifications, a notify message, wherein said notify message comprises said PFD and said application identification.

In an example, the method further comprises the step of:
- receiving, by said NEF, from a Session Management Function, SMF, a trigger message requesting PFDs for an application ID;
- wherein said step of sending, from said NEF, to said AF, said PFD request message is triggered by said received trigger message.

For example, a PCT may trigger Npcf_SMPolicyControl_Create Response message towards a Session Management Function, SMF, including the Policy and Charging Control, PCC, rules to be applied for a particular user Protocol Data Unit, PDU, session. In this case, there may be a PCC rule for App-IDId=example.com, including some enforcement actions such as Charging and QoS. The SMF may identify that it has no PFD rules for App-ID=example.com so it may trigger a PFD Management pull procedure by triggering towards NEF a Nnef HTTP GET (Request), i.e. the trigger message, for the Nnef_PFDManagement service, i.e. the PFD management service, and for App-ID=example.com. Such a trigger from the SMF may initiate the rest of the procedure as mentioned earlier in the present disclosure.

In another example, prior to sending said request message to said AF, said method comprises the steps of:
  querying, by said NEF, a Unified Data Repository, UDR, for said PFD for said application identification;
  receiving, by said NEF, a negative query response from said UDR indicating that said UDR does not have said PFD.

In a third aspect of the present disclosure, there is presented an Access Function, AF, comprised by a Service Based Architecture, SBA, based telecommunication network, said AF being arranged for implementing a Packet Flow Descriptor, PFD, management service allowing request and response message from and to a Network Exposure Function, NEF, said AF comprising:
  receive equipment arranged for receiving from said NEF, a request message for requesting a PFD, wherein said request message comprises an application identification for identifying an application;
  transmit equipment arranged for transmitting to said NEF, a response message comprising said application identification and said requested PFD.

In an example, the transmit equipment is further arranged for transmitting, to said NEF, an on-board request message comprising an indication of supporting said PFD management service and comprising a list of application identifications that are supported by said PFD management service for obtaining PFDs.

In a further example, the on-board request message further comprises said list of application identifications along with supported classification type, being at least one of deterministic traffic filters, non-deterministic heuristic rules, machine learning models.

In another example, the receive equipment is further arranged for receiving, from said NEF, a subscription request message comprising a list of application identifications, wherein said subscription request message is for requesting to be notified when a new PFD is available for an application identification in said list of application identifications,
  and wherein said transmit equipment is further arranged for transmitting, to said NEF, when a new PFD is available for an application identification in said list of application identifications, a notify message, wherein said notify message comprises said PFD and said application identification.

The definitions and advantages relating to the first aspect of the present disclosure being a method of supporting PFD management service in an SBA telecommunication network also relate to the third aspect of the present disclosure being an Access Function.

In a fourth aspect of the present disclosure, there is presented a Network Exposure Function, NEF, comprised in a Service Based Architecture, SBA, based telecommunication network, said NEF being arranged for supporting a Packet Flow Descriptor, PFD, management service allowing request and response message to and from an Application Function, AF, and comprising transmit equipment arranged for sending to said AF, a PFD request message, wherein said PFD request message comprises an application identification for which a PFD is requested, and receive equipment arranged for receiving from said AF, said requested PFD for said identified application.

The definitions and advantages relating to the second aspect of the present disclosure being a method of supporting PFD management service in an SBA telecommunication network also relate to the fourth aspect of the present disclosure being a Network Exposure Function.

In a fifth aspect of the present disclosure, there is presented a computer program product, comprising a computer readable storage medium storing instructions which when executed on at least one processor cause said at least one processor to carry out the method according to any of the embodiments of the first and second aspects of the present disclosure.

In this aspect of the disclosure, a computer readable storage medium is provided with instructions that enable a system onto which said storage medium has been loaded to perform a method according to the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

The Invention according to the present disclosure is further elaborated with the help of diagrams that enable further understanding of the present disclosure. The illustrations are not limiting and are merely explanatory.

Figure 1:
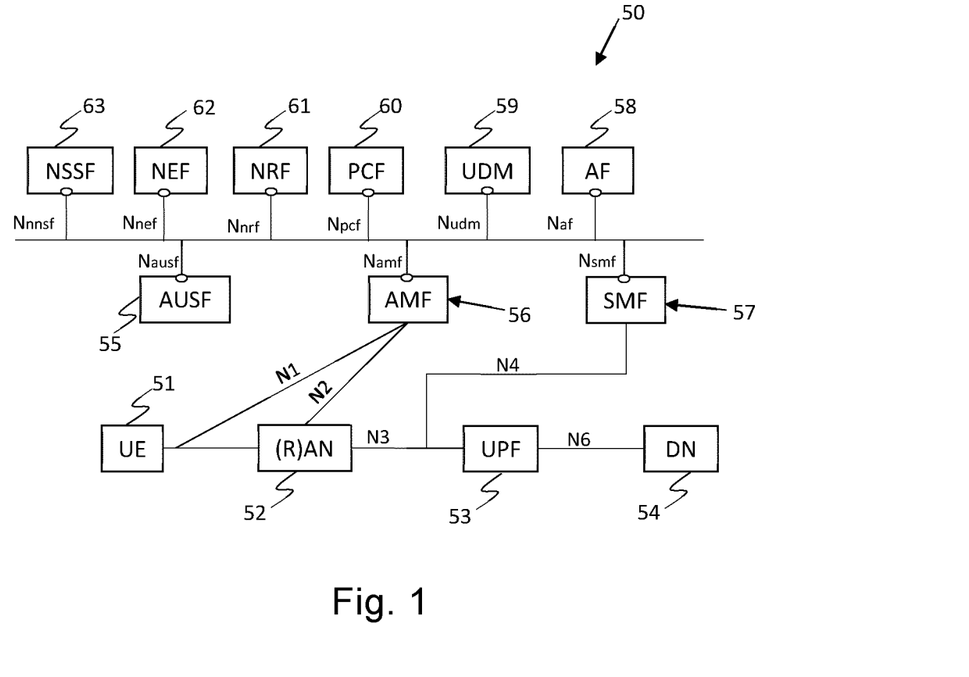
FIG. 1 schematically illustrates a part of the architecture of a Fifth Generation, 5G, telecommunication network.

FIG. 1 schematically illustrates a part of the architecture of a Fifth Generation, 5G, telecommunication network, 50. In FIG. 1, reference numeral 50 indicates a reference architecture for a 5G system. The 5G system architecture comprises the following Network Functions, NFs:
  Authentication Server Function, AUSF, 55
  Access and Mobility Management Function, AMF, 56
  Data network, DN, e.g. operator services, Internet access or third party services, 54
  Network Exposure Function, NEF, 62
  NF Repository Function, NRF, 61
  Policy Control Function, PCF, 60

Session Management Function, SMF, 57
Unified Data Management, UDM, 59
User Plane Function, UPF, 53
Application Function, AF, 58
User Equipment, UE, 51
Network Slice Selection Function, NSSF, 63.

The functional description of these network functions is specified in clause 6 of the 3GPP standard 23.501, "System Architecture for the 5G system", the contents of which are included herein, by reference.

Figure 2:
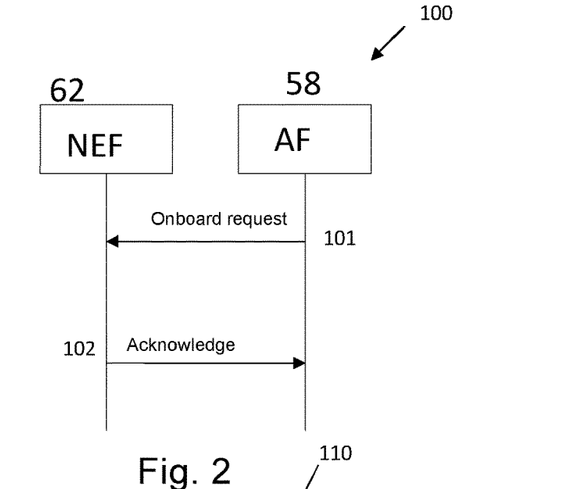
FIG. 2 schematically illustrates a method according to the present disclosure.

FIG. 2 shows the AF 58 onboard procedure 100 in case it implements a new PFD Management service.

In step 101, the AF sends a newly defined onboard request to NEF 62 including:
Service=PFDManagement—Indication of the new service supported
list (App-ID, classification-types)—List of supported App-IDs along with the supported classification type. The classification types are:
deterministic traffic filters
non-deterministic heuristic rules
machine learning models
New App-IDs allowed (yes/no)—An indication of whether the AF 58 admits requests for App-IDs not included in the above list.
In step 102, the NEF 62 acknowledges the onboard request.

Figure 3:
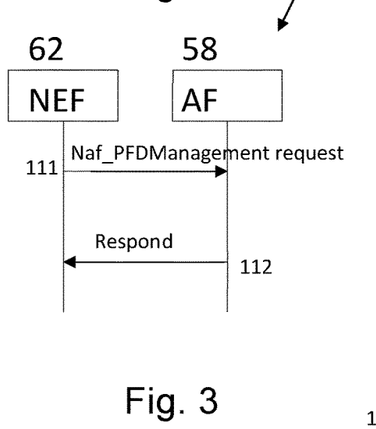
FIG. 3 schematically illustrates a method according to the present disclosure.

FIG. 3 shows 110 the request from NEF 62 to the PFD management service offered by the AF 58. In the step 111, NEF 62 invokes the NafPFDManagement Request service in AF 58 including:
list (App-ID)—The list of App-IDs to retrieve the PFDs
operator-ID—The ID of the operator so that AF can identify it and apply the proper permissions.
location-ID—An indication of the location of operation of the operator. This may influence the App-IDs the operator is able to retrieve given the operation zone (e.g. a given country).

In step 112, the AF 112 responds including a list of tuples, each tuple including App-ID, PFDs—Including deterministic traffic filters non-deterministic heuristic rules and machine learning models. Both the non-deterministic heuristic rules and machine learning models are new parameters within the standard PFD specification.

Figure 4:
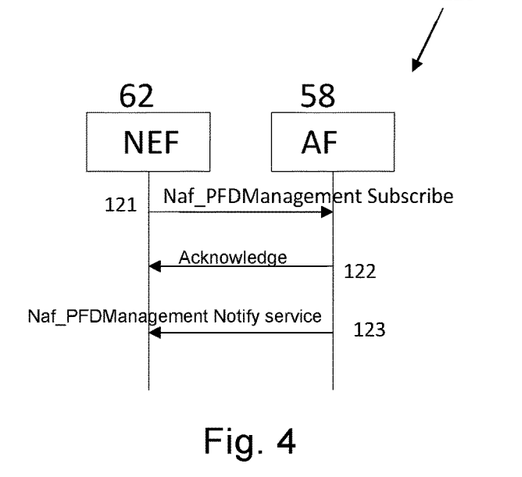
FIG. 4 schematically illustrates a method according to the present disclosure.

FIG. 4 shows the subscription procedure 120 from NEF 62 to the new PFD management service in AF 58. Alternate to the request response procedure, the NEF 62 may subscribe to notifications from the AF 58 regarding PFDs. In step 121, the NEF 62 invokes the NafPFDManagement Subscribe service in AF 58 including list (App-ID)—As described in connection with FIG. 3, operator-ID—as described previously, and location-ID.

In step 122, the AF 58 acknowledges the subscription request. And if available, AF 58 can include in the response the corresponding list of App-IDs, PFDs.

When a new PFD is available for an App-ID, AF 58 invokes the NafPFDManagement Notify service operation 123 including App-ID, PFD including the heuristic rules and machine learning models if available.

Figure 5:
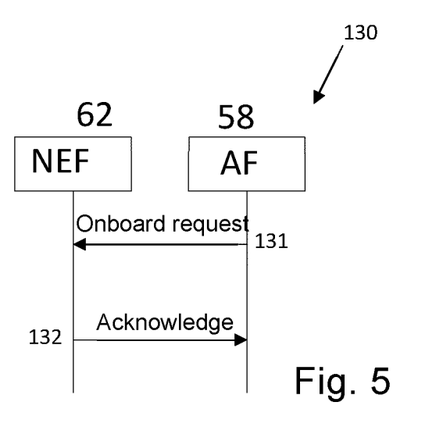
FIG. 5 schematically illustrates a method according to the present disclosure.

FIG. 5 shows the AF 58 onboard procedure 130 in case it implements a new Event-ID. The AF 58 sends 131 an onboard request to NEF 62 including Event-ID=TRAFFIC_RULES/TRAFFIC_MODELS—Indication of the new Event supported, list (App-ID, classification-types)—List of supported App-IDs along with the supported classification type. The classification types are deterministic traffic filters, non-deterministic heuristic rules, and machine learning models. The onboard request also includes New App-IDs allowed (yes/no)—An indication of whether the AF admits requests for App-IDs not included in the above list. In step 132, the NEF 62 acknowledges the onboard request.

Figure 6:
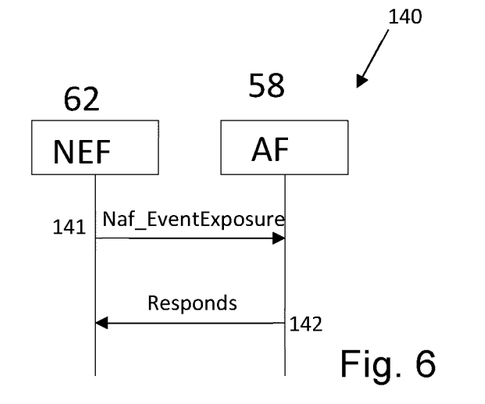
FIG. 6 schematically illustrates a method according to the present disclosure.

FIG. 6 shows 140 the request from NEF 62 to the new event offered by the AF 58. The NEF 62 invokes 141 the Naf_EventExposure Request service in AF including Event-ID=TRAFFIC_RULES/TRAFFIC_MODELS, list (App-ID)—The list of App-IDs to retrieve the PFDs, operator-ID—The ID of the operator so that AF can identify it and apply the proper permissions, and location-ID—An indication of the location of operation of the operator. This may influence the App-IDs the operator is able to retrieve given the operation zone (e.g. a given country).

The AF 58 responds 142 including a list of tuples, each tuple including App-ID, PFDs—Including deterministic traffic filters, non-deterministic heuristic rules, and machine learning models. Both the non-deterministic heuristic rules and machine learning models are new parameters within the standard PFD specification.

Figure 7:
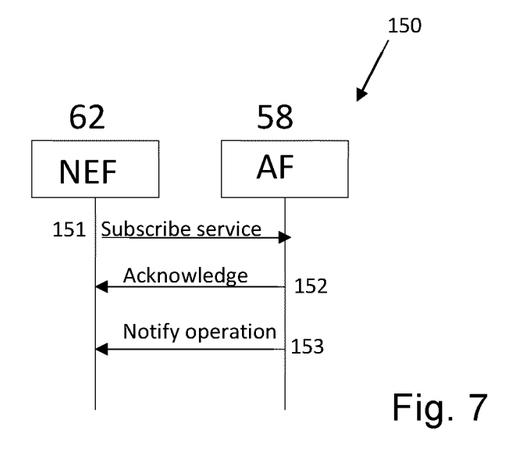
FIG. 7 schematically illustrates a method according to the present disclosure.

FIG. 7 shows the subscription procedure 150 from NEF 62 to the event exposed by AF 58. The NEF 62 invokes the Naf_EventExposure Subscribe service 151 in AF 58 including Event-ID=TRAFFIC_RULES/TRAFFIC_MODELS, list (App-ID) operator-ID, and location-ID. These parameters have been described previously in the present disclosure. The AF 58 acknowledges 152 the subscription request. If available, AF 58 can include in the response the corresponding list of (App-IDs, PFDs).

In a new message, when a new PFD is available for an App-ID, AF 58 invokes 153 the Naf_EventExposure Notify service operation including App-ID, and PFD including the heuristic rules and machine learning models if available.

Figure 8:
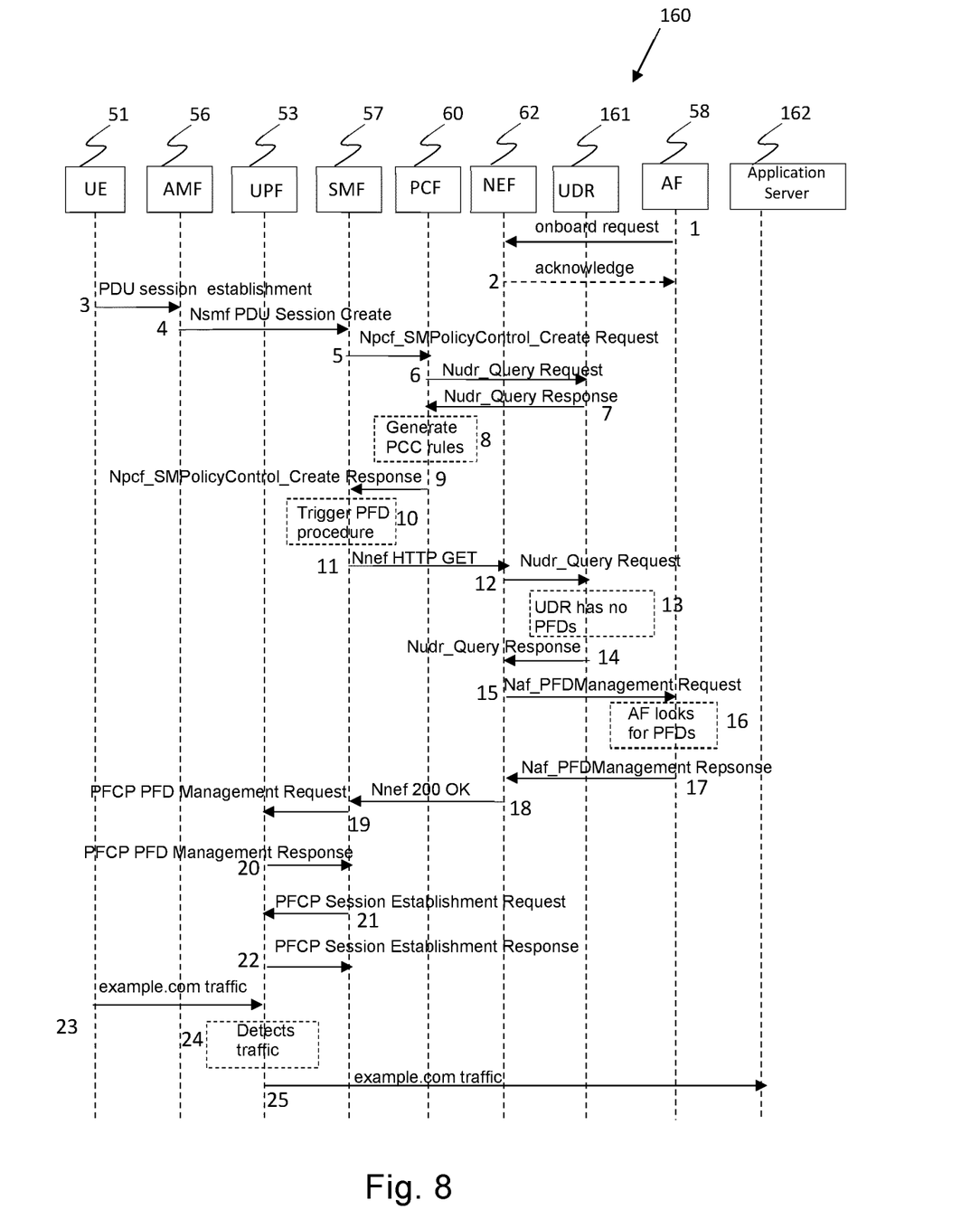
FIG. 8 schematically illustrates a method according to the present disclosure.

FIG. 8 shows an example 160 of Use Case, PFD Management pull procedure, using the external AF 58 traffic classification service for a certain application (example.com):

AF 58 sends 1 an onboard request to NEF 62 including Service=PFDManagement—Indication of the new service supported, list of App-ID (including example.com). In this example, for simplicity, no classification-types are included. The NEF 62 acknowledges 2 the onboard request.

The UE 51 triggers 3 PDU session establishment, by means of sending a PDU Session Establishment Request to AMF 56. The AMF 56 selects 4 an SMF 57 to manage the PDU session. The SMF 57 selection function in the AMF 56 selects an SMF instance based on the available SMF instances obtained from NRF 61 or on the configured SMF information in the AMF 56 and triggers Nsmf PDU Session Create. Note the sequence diagram in FIG. 8 does not include all the signaling messages involved in the PDU Session Establishment procedure. Only the steps relevant to the present disclosure are illustrated and elaborated.

SMF 57 triggers 5 Npcf_SMPolicyControl_Create Request message to retrieve SM policies for the user PDU session. The PCF 60 triggers 6 Nudr_Query Request message to retrieve the policy data for this user's PDU session. The UDR 161 answers 7 with Nudr_Query Response message including the Subscriber Policy Data.

PCF 60 generates 8 the corresponding PCC rule/s based on Subscriber Policy Data. Based on the above, the PCF 60 triggers 9 Npcf_SMPolicyControl_Create Response message including the PCC rules to be applied for this user PDU session. In this case, there will be a PCC rule for App-IDId=example.com, including some enforcement actions such as Charging and QoS.

SMF 57 has no PFD rules for App-ID=example.com so it triggers 10 PFD Management pull procedure. SMF 57 triggers 11 towards NEF 62 a Nnef HTTP GET (Request) for the Nnef_PFDManagement service and for App-ID=example.com NEF 62 contacts 12 UDR 161 and triggers a Nudr_Query Request message including App-ID=example.com as a parameter. UDR 161 determines 13 that it has no PFDs for appId=example.com In step 14, UDR 161 answers NEF 62 with a Nudr_Query Response message indicating no data for App-ID=example.com as a parameter. In step 15, NEF 62 invokes the Naf_PFDManagement Request service in AF 58 including App-ID=example.com, operator-ID=operator X.

The AF 58 looks 16 for the PFDs corresponding to App-ID=example.com and operator-ID, and answers 17 NEF 62 with a Naf_PFDManagement Response message including the PFDs: App-ID=example.com, PFDs.

NEF 62 answers 18 the message in Step 11 above by triggering a Nnef 200 OK including the PFDs for App-ID=example.com. SMF 57 triggers 19 PFCP PFD Management request towards UPF including the PFDs for App-ID=example.com.

UPF 53 answers 20 with a PFCP PFD Management response message. SMF 57 triggers 21 a PFCP Session Establishment request message towards UPF 53 with the PDRs (Packet Detection Rules) for the App-IDs, specifically a PDR for App-ID=example.com with the associated FAR, QER and URR. UPF 53 answers 22 SMF 57 with a PFCP Session Establishment response message. When a user 51 starts 23 an application (example.com), the UPF 53 detects 24 example.com traffic, based on the PFDs, and applies the corresponding enforcement actions such as Charging, QoS. Finally, the UPF 53 forwards 25 the application traffic towards the application server, 162.

Figure 9:
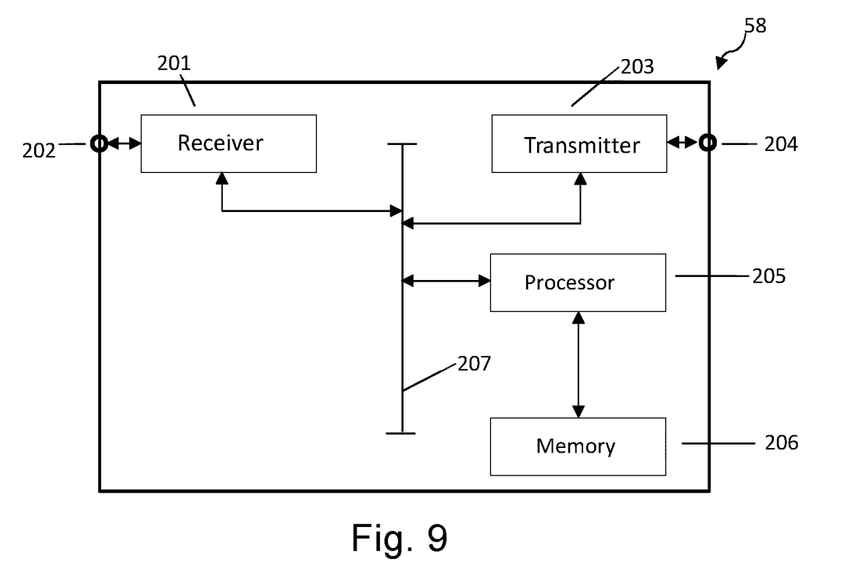
FIG. 9 schematically illustrates an application function according to the present disclosure.

FIG. 9 schematically illustrates an application function 58 according to the present disclosure. The application function 58 comprises a receiver 201, 202 arranged to receive signals from other devices in the communication network. The function 58 also comprises transmitting means 203, 204 arranged to transmit signal to other devices in the communication network. It may be understood by the skilled person that the receiver 201, 202 and transmitter 203, 204 are separately shown merely for illustrative purposes. The combined functionality may be achieved by a transceiver, for example.

The receiver 201, 202 may further be arranged for receiving, a request message for requesting a PFD, wherein said request message comprises an application identification for identifying an application. The transmitter 203, 204 is arranged for transmitting, by said AF, to said NEF, a response message comprising said application identification and said requested PFD.

The application function 58 further comprises processor 205 and memory 206. The memory may be arranged to store a computer program product which when executed by the processor 205 causes the device 58 to perform a method according to the present disclosure. The internal components communicate with one another using an internal bus 207.

Figure 10:
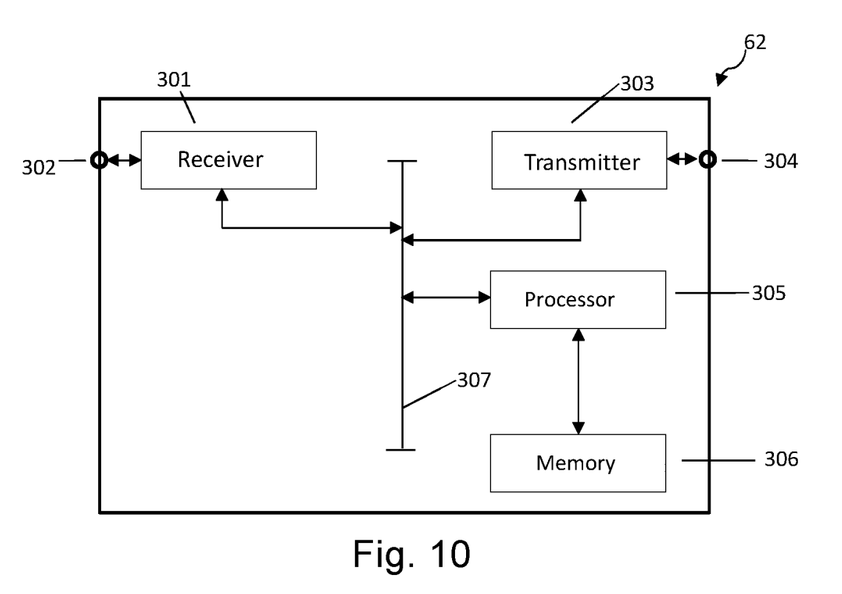
FIG. 10 schematically illustrates an network exposure function according to the present disclosure.

FIG. 10 schematically illustrates an network exposure function 62 according to the present disclosure. The function 62 comprises a receiver 301, 302 arranged to receive signals from other devices in the communication network. The function 62 also comprises transmitting means 303, 304 arranged to transmit signal to other devices in the communication network. It may be understood by the skilled person that the receiver 301, 302 and transmitter 303, 304 are separately shown merely for illustrative purposes. The combined functionality may be achieved by a transceiver, for example.

The transmitter 303, 304 is arranged for sending to said AF, a PFD management request, wherein said PFD management request identifies an application and operator for which PFDs are requested. The receiver 301, 302 is arranged for receiving from said AF, said requested PFDs for said identified application and operator. The transmitter 303, 304 may further be arranged for sending a PFD management request for one of the applications identified in a list of application IDs received by said NEF during on-boarding.

The receiver 301, 302 may further be arranged for receiving, from a Session Management Function, SMF, a trigger message requesting PFDs for a particular application identified by a corresponding application ID.

The network exposure function 62 further comprises processor 305 and memory 306. The memory may be arranged to store a computer program product which when executed by the processor 305 causes the device 62 to perform a method according to the present disclosure. The internal components communicate with one another using an internal bus 307.

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as optical storage medium or a solid-state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of supporting Packet Flow Descriptor (PFD) management implemented by an Application Function (AF) in a Service Based Architecture (SBA) based telecommunication network, the method comprising:

transmitting to a Network Exposure Function (NEF) in the telecommunications network, an on-board request message comprising an indication of supporting a PFD management service and comprising a list of application identifications and classification types that are supported by the PFD management service for obtaining PFDs;

receiving, from the NEF, a request message for requesting a PFD, the request message comprising an application identification for identifying an application, the request message corresponding to a PFD pull procedure triggered by a Session Management Function (SMF), the PFD pull procedure including a query of a Unified Data Repository (UDR) for the PFD for the application identification enabling the SMF to identify that the requested PFD for the application identification is available; and transmitting, to the NEF, a response message comprising the application identification and the requested PFD.

2. The method of claim 1, wherein the on-board request message further comprises the list of application identifications along with supported classification type, being at least one of:
   a deterministic traffic filter;
   a non-deterministic heuristic rule; or
   a machine learning model.

3. The method of claim 1, wherein the method further comprises:
   receiving, from the NEF, a subscription request message comprising a list of application identifications, wherein the subscription request message is for requesting to be notified when a new PFD is available for an application identification in the list of application identifications; and
   transmitting, to the NEF, when a new PFD is available for an application identification in the list of application identifications, a notify message, wherein the notify message comprises the PFD and the application identification.

4. The method of claim 1, wherein the request message further comprises any of:
   an identification of an operator of the telecommunication network; or
   an indication of the location of operation of the operator.

5. A method of supporting Packet Flow Descriptor (PFD) management implemented by a Network Exposure Function (NEF) in a Service Based Architecture (SBA) based telecommunication network, the method comprising:
   receiving, from an Application Function (AF) in the telecommunications network, an on-board request message comprising an indication of supporting the PFD management service and comprising a list of application identifications and classification types that are supported by the PFD management service for obtaining PFDs;
   sending, to the AF, a PFD request message, the PFD request message comprising an application identification for which a PFD is requested, the request message corresponding to a PFD pull procedure triggered by a Session Management Function (SMF), the PFD pull procedure including a query of a Unified Data Repository (UDR) for the PFD for the application identification and enabling the SMF to identify that the requested PFD for the application identification is available; and
   receiving, from the AF, the requested PFD for the identified application.

6. The method of claim 5, wherein the method further comprises the step of:
   receiving, from the Session Management Function (SMF), a trigger message requesting PFDs for an application ID;
   wherein the step of sending the PFD request message is triggered by the received trigger message.

7. The method of claim 6, wherein, prior to sending the request message to the AF, the method comprises the steps of:
   Querying the UDR for the PFD for the application identification; and
   receiving a negative query response from the UDR indicating that the UDR does not have the PFD.

8. The method of claim 5, wherein the on-board request message further comprises the list of application identifications along with supported classification type, being at least one of:
   deterministic traffic filters;
   non-deterministic heuristic rules; or
   machine learning models.

9. The method of claim 5, wherein the method further comprises the steps of:
   transmitting, to the AF, a subscription request message comprising a list of application identifications, wherein the subscription request message is for requesting to be notified when a new PFD is available for an application identification in the list of application identifications; and
   receiving, from the AF, when a new PFD is available for an application identification in the list of application identifications, a notify message, wherein the notify message comprises the PFD and the application identification.

10. The method of claim 5, wherein the request message further comprises any of:
    an identification of an operator of the telecommunication network; or
    an indication of the location of operation of the operator.

11. An Access Function (AF) comprised by a Service Based Architecture (SBA) based telecommunication network, the AF being arranged for implementing a Packet Flow Descriptor (PFD) management service allowing request and response message from and to a Network Exposure Function (NEF) the AF comprising a processor configured to:
    transmitting, to the NEF, an on-board request message comprising an indication of supporting the PFD management service and comprising a list of application identifications and classification types that are supported by the PFD management service for obtaining PFDs;
    receive from the NEF, a request message for requesting a PFD, the request message comprising an application identification for identifying an application, the request message corresponding to a PFD pull procedure triggered by a Session Management Function (SMF), the PFD pull procedure including a query of a Unified Data Repository (UDR) for the PFD for the application identification enabling the SMF to identify that the requested PFD for the application identification is available; and
    transmit to the NEF, a response message comprising the application identification and the requested PFD.

12. The AF in accordance with claim 11, wherein the on-board request message further comprises the list of application identifications along with supported classification type, being at least one of:
    deterministic traffic filters;
    non-deterministic heuristic rules; or
    machine learning models.

13. The AF of claim 11, wherein the processor is further arranged for receiving, from the NEF, a subscription request message comprising a list of application identifications, wherein the subscription request message is for requesting to be notified when a new PFD is available for an application identification in the list of application identifications, and wherein the processor is further arranged for transmitting, to the NEF, when a new PFD is available for an application identification in the list of application identifications, a notify message, wherein the notify message comprises the PFD and the application identification.

14. A Network Exposure Function (NEF) in a Service Based Architecture, (SBA) based telecommunication network, the NEF being arranged for supporting a Packet Flow Descriptor (PFD) management service allowing request and response message to and from an Application Function (AF) and comprising a processor configured to:
receiving, from the AF, an on-board request message comprising an indication of supporting the PFD management service and comprising a list of application identifications and classification types that are supported by the PFD management service for obtaining PFDs;
transmit to the AF, a PFD request message, the PFD request message comprising an application identification for which a PFD is requested, the PFD request message corresponding to a PFD pull procedure triggered by a Session Management Function (SMF), the PFD pull procedure including a query of a Unified Data Repository (UDR) for the PFD for the application identification enabling the SMF to identify that the requested PFD for the application identification is available; and
receive from the AF, the requested PFD for the identified application.

15. The NEF of claim 14, wherein the processor is further arranged for receiving, from the Session management Function (SMF) a trigger message requesting PFDs for an application ID;
wherein the processor is triggered by the received trigger message for sending the PFD request message.

16. The NEF of claim 14, wherein the processor is further arranged for querying the UDR for the PFD for the application identification, and wherein the processor is further arranged for receiving a negative query response from the UDR indicating that the UDR does not have the PFD.

* * * * *